US010753405B2

(12) United States Patent
Putzer et al.

(10) Patent No.: US 10,753,405 B2
(45) Date of Patent: *Aug. 25, 2020

(54) CLUTCH ASSEMBLY FOR A DRIVELINE (71) Applicant: GKN Driveline Bruneck AG, Bruneck (IT)

(72) Inventors: Hanspeter Putzer, Gais (IT); Sigmund Senoner, Bruneck (IT); Kurt Thomaser, Welsberg (IT); Peter Raffin, Kiens (IT); Ivan Gruber, Schabs (IT); Dieter Huber, Olang (IT); Thomas Widmann, Rodeneck (IT)

(73) Assignee: GKN Driveline Bruneck AG, Bruneck (IT)

( * ) Notice: Subject to any disclaimer, the term of this patent is extended or adjusted under 35 U.S.C. 154(b) by 296 days.

This patent is subject to a terminal disclaimer.

(21) Appl. No.: 15/874,985

(22) Filed: Jan. 19, 2018

(65) Prior Publication Data

US 2018/0216672 A1    Aug. 2, 2018

(30) Foreign Application Priority Data

Jan. 31, 2017    (EP) ..................................... 17153890

(51) Int. Cl.
*F16D 13/52*    (2006.01)
*F16D 25/12*    (2006.01)
(Continued)

(52) U.S. Cl.
CPC ................ *F16D 13/52* (2013.01); *B60K 1/00* (2013.01); *B60K 17/02* (2013.01); *B60K 17/16* (2013.01);
(Continued)

(58) Field of Classification Search
CPC .... F16D 13/52; F16D 25/123; F16D 25/0638; F16D 13/70; F16D 13/72; F16D 13/74;
(Continued)

(56) References Cited

U.S. PATENT DOCUMENTS

| 8,388,486 | B2 | 3/2013 | Ekonen et al. |
| 2016/0341300 | A1* | 11/2016 | Drill ........................ F16D 13/74 |
| 2018/0010682 | A1* | 1/2018 | Pritchard ............. F16H 57/0473 |

FOREIGN PATENT DOCUMENTS

| DE | 101 50 704 A1 | 4/2003 |
| DE | 697 25 150 T2 | 6/2004 |

(Continued)

*Primary Examiner* — Jeffrey A Shapiro
(74) *Attorney, Agent, or Firm* — Bejin Bieneman PLC (57) ABSTRACT

A clutch assembly for a driveline of a motor vehicle comprises a friction plate clutch having an inner plate carrier, to which inner plates are connected in a rotationally fixed and axially movable way, and having an outer plate carrier to which outer plates are connected in a rotationally fixed and axially movable way, and wherein the inner plates and the outer plates jointly form a plate package, wherein the inner plate carrier comprises at least one bore in an axial overlapping region with the plate package through which bore oil can flow to the plate package, a supporting plate against which the plate package is axially supported, an axially movable pressure plate for axially loading the plate package, an operating device for operating the friction plate clutch by axially moving the pressure plate, a flow controller for controlling an oil volume flow rate through the at least one bore of the inner plate carrier, wherein the flow controller comprises a setting member which is operable by the operating device for the friction plate clutch, wherein the setting member comprises a cover portion for covering a mouth region of the at least one bore.

13 Claims, 3 Drawing Sheets

(51) Int. Cl.
*B60K 1/00* (2006.01)
*F16D 25/0638* (2006.01)
*B60K 17/02* (2006.01)
*B60K 17/16* (2006.01)
*F16D 13/70* (2006.01)
*F16D 13/72* (2006.01)
*F16D 13/74* (2006.01)
*F16D 23/12* (2006.01)

(52) U.S. Cl.
CPC ............. *F16D 13/70* (2013.01); *F16D 13/72* (2013.01); *F16D 13/74* (2013.01); *F16D 23/12* (2013.01); *F16D 25/0638* (2013.01); *F16D 25/123* (2013.01); *B60K 2001/001* (2013.01); *F16D 2023/123* (2013.01)

(58) Field of Classification Search
CPC .... F16D 23/12; F16D 2023/123; F16D 13/58; B60K 1/00; B60K 17/02; B60K 17/16; B60K 2001/001; F16H 61/32
See application file for complete search history.

(56) References Cited

FOREIGN PATENT DOCUMENTS

| | | |
|---|---|---|
| DE | 10 2011 086 376 B4 | 5/2015 |
| DE | 10 2015 220 446 B3 | 12/2016 |
| EP | 2105336 A2 | 9/2009 |
| EP | 2108855 A1 | 10/2009 |
| EP | 2163777 A2 | 3/2010 |
| JP | 5617996 B2 | 11/2014 |
| WO | 2015150407 A1 | 10/2015 |

\* cited by examiner

CLUTCH ASSEMBLY FOR A DRIVELINE

CROSS-REFERENCE TO RELATED APPLICATIONS

This application claims priority to European Application No. EP 17153890.3, filed on Jan. 31, 2017, which application is hereby incorporated herein by reference in its entirety.

BACKGROUND

Generally, a sufficient supply of oil is essential for friction plate clutches to sufficiently lubricate components that rotate relative to one another, and to discharge friction-generating heat. On the other hand, a high oil volume flow leads to drag moments and thus to undesirable losses.

From U.S. Pat. No. 8,388,486 B2 a driveline of a motor vehicle is known with a disconnectable propeller shaft, wherein a first clutch is arranged in the performance path in front of the propeller shaft and a second clutch behind the propeller shaft. The second clutch is provided in the form of a friction clutch running under wet conditions, which clutch can be operated by a ball ramp assembly. A valve is provided for reducing the oil flow to the friction plate clutch when the propeller shaft is disconnected. The valve cooperates with a lubrication pipe which is fixed in the housing and which supplies the friction clutch with oil.

DE 101 50 704 A1 proposes a plate clutch for motor bicycles, which clutch comprises a hollow-cylindrical clutch shaft and a regulator for controlling the oil flowing in the clutch shaft. The regulator comprises a valve with a tappet and an aperture, which valve is arranged inside the clutch shaft. The tappet is connected to an axially movable disengagement element of the plate clutch. In the coupled condition of the plate clutch, the tappet in a position approaching the aperture, which corresponds to a low oil volume flow and in the uncoupled condition it is in a position where it is moved away from the aperture, which corresponds to a greater oil volume flow.

From DE 697 25 150 T2 a disc clutch assembly is known with an inner plate carrier and an outer plate carrier. The outer plate carrier comprises a toothed structure in which the outer plates are held in a rotationally fixed and axially movable way. In the region of the tooth gaps of the toothed structure, radial through-openings are provided over the circumference through which lubricating oil can flow radially outwardly to de-oil the clutch.

From DE 10 2011 086 376 B4 an oil supply device is known for a plate brake in a transmission module. For cooling purposes with the plate brake being in slip condition, an oil injection is provided which is controlled by a valve regulator. The supply of oil only takes place in operational slip phases of the plate brake. The valve regulator can be coupled to the signal of the piston control means of the multi-plate brake.

WO 2015 150 407 A1 proposes a drive assembly for a motor vehicle having an electric motor, a multi-stage transmission and a differential gearing. The multi-stage transmission comprises two transmission stages for driving the differential gearing under different transmission ratios. The transmission stages can be switched by a controllable switching unit which is arranged coaxially relative to the driveshaft. The driveshaft comprise a bearing bore as well as a plurality of transverse bores for supplying the seat portions of the gears arranged on the driveshaft and the switching unit.

DESCRIPTION

The present disclosure relates to a clutch assembly having a friction plate clutch and a passive lubricant supply, more particularly for the driveline of a motor vehicle. Friction plate clutches are used in drivelines to allow a friction-based transmission of torque between two drive components such as a driveshaft and/or driving gears. They permit drivelines to be switched at any speed differentials under torque load. Wet-type friction plate clutches comprise a plurality of friction plates which are cooled and lubricated by a surrounding oil.

Disclosed herein is a clutch assembly which permits the oil supply to be adapted to the respective requirements and which comprises a high degree of efficiency and low performance losses respectively. Further disclosed is a drive assembly having such a clutch assembly, wherein undesirable drag moments and friction losses are reduced.

A clutch assembly for a driveline of a motor vehicle can comprise: a friction plate clutch having an inner plate carrier, to which inner plates are connected in a rotationally fixed and axially movable way, and having an outer plate carrier to which outer plates are connected in a rotationally fixed and axially movable way, and wherein the inner plates and the outer plates jointly form a plate package, wherein, in an axial overlapping region with the plate package, the inner plate carrier comprises at least one bore through which oil can flow to the plate package; the clutch assembly further comprising a supporting plate against which the plate package is axially supported; an axially movable pressure plate for axially loading the plate package; an operating device for operating the friction plate clutch by axially moving the pressure plate; and a flow controller for controlling a volume flow rate of oil flowing through the at least one bore of the inner plate carrier, wherein the flow controller comprises a setting member which is operable by the operating device for the friction plate clutch, wherein the setting device comprises a cover portion for covering an opening region of the at least one bore.

The clutch assembly, in an advantageous way, permits controlling of the oil supply to the friction plate clutch as a function of the respective requirements. The setting level of the operating device, on which the condition of the friction plate clutch also depends, serves as a control parameter for the oil volume flow to the clutch. The operating device can have a double function, i.e., operating the clutch on the one hand and controlling the oil supply for the clutch on the other hand. Upon operating the friction plate clutch, the setting member is moved simultaneously, so that an in-flow cross-section formed between the bore and the control portion is changed. It is proposed that under operating conditions where no lubrication or only a reduced lubrication, and/or cooling, is required, especially when the friction plate clutch is fully open, the oil volume supply is minimised, so that the drag losses are also minimised. Under operating conditions in which the friction plate clutch is operating in the closed state, especially if torque is transmitted under a slip condition, the in-flow cross-section and thus the oil volume flow are correspondingly large. Under this condition, the friction plates are lubricated particularly well and/or, any heat generated in the friction plates is effectively discharged via the increased oil volume flow. Overall, the friction plate clutch comprises a particularly high degree of efficiency and features only low performance losses.

An exemplary clutch assembly can be arranged anywhere in the driveline of a motor vehicle in the performance path between a drive source and the wheels, for example, in front, within, or behind a reduction gearing, and/or in front of, within, or behind an angle drive, and/or in front of, within, or behind a power take off unit (PTU), and/or within a propeller shaft or in front of, within, or behind a differential gearing and/or within a sideshaft. In this connection, the term in front shall refer to an arrangement upstream and the term behind shall refer to an arrangement downstream with respect to the power path of the respective component.

The oil serves to discharge the friction-generated heat and for lubricating the components which come into friction contact with one another. Due to the centrifugal force, the oil entering through the bores in the inner plate carrier flows outwards and can return into the oil sump through corresponding bores in the outer plate carrier. The flowing oil can also cool and lubricate other movable mechanical parts such as bearings or seals.

The inner plate carrier can comprise a plurality of circumferentially distributed bores, wherein the lubricant flow is controllable by axially moving the setting member. The bores or at least some of the bores can be arranged at an axial offset relative to one another, i.e. the circumferentially distributed bores can be arranged in several transverse planes arranged at a distance from one another. This ensures an effective supply of oil along the entire axial length of the plate package, because the oil reaches the friction plates in several circumferential locations and in several locations along the axial length.

According to an example embodiment, the setting member is connected to the inner plate carrier in a rotationally fixed and axially movable manner. More particularly, the setting member can be disc-like. According to an embodiment, the setting member can comprise a plurality of circumferentially distributed, axially extending cover portions which are jointly moved with the setting member upon operating the clutch by the operating device. The cover portions cooperate with the bores of the inner plate carrier for variably opening and closing same, respectively. The form of the cover portions can be generally selected as needed and, more particularly, depends on the configuration of the bores and openings respectively. For example, the cover portions can be provided in the form of oblong elements which extend parallel to the longitudinal axis to cover one or several bores in a row at the inner face the plate carrier. However, it is also possible that the cover portions cooperate with bores in an end face of the plate carrier. In this case the cover portions can be arranged perpendicularly relative to the longitudinal axis and can be configured as planar segments, for example. The number and arrangement of the circumferentially distributed cover portions can correspond to the number and arrangement of the circumferential portions in which the inner plate carrier comprises bores, so that accordingly, the oil volume flow through all bores is controllable by the setting member.

The inner plate carrier can comprise a sleeve portion which, on its radial outside, comprises an engaging structure that is engaged by the inner plates in a rotationally fixed and axially movable way and which, on its radial inside, comprises an inner face with at least one or several axially extending channels, wherein the bores of the inner plate carrier are arranged in the region of the at least one channel. As a result of the centrifugal force, the oil located at the inner face of the sleeve portion reaches the channels and from there flows into the mouths of the bores.

The bores extend from the inner face of the inner plate carrier, respectively from the channels formed therein, through the sleeve portion radially outwardly to the outer face, so that oil can reach the receiving chamber for the plate package. The inner face of the inner plate carrier can also be provided with an engaging structure in order to connect the inner plate carrier in a rotationally fixed way to an attachable part such as a driveshaft, for torque transmitting purposes. The engaging structure for example can be configured in the form of splines which can be made to engage corresponding counter splines of the attachable part.

In an example embodiment, the cover portions of the setting member can each extend into an associated channel. More particularly, it is proposed that the bottom face of one or several channels and the associated cover portions are configured to be planar. A planar surface contact between a channel and the respective cover portions ensures very good sealing conditions, so that, in the closed condition of the setting element, the volume flow is as low as it can be, which leads to correspondingly low drag losses.

Depending on the number and the distribution of the bores in the inner plate carrier, the cover portions of the setting member can comprise one or several apertures. The apertures are arranged relative to the bores of the inner plate carrier such that in a closed, respectively friction position of the friction plate clutch they are arranged at least largely, possibly completely, so as to be aligned with the bores of the inner plate carrier, so that a large oil volume flow reaches the plate package for cooling and lubricating the plate. "To be at least largely aligned" means in particular that at least half or more, e.g., all, of the cross-sectional faces of the bore are released, so that oil can freely enter.

In an open position of the friction plate clutch, the tongue apertures are arranged so as be at least largely offset, e.g. completely offset relative to the bores, so that the volume flow through the bores is minimised. "To be offset at least largely" shall mean that the cross-sectional faces of the bores are each covered at least half or more, e.g., completely by the cover portion surrounding the apertures.

The setting member is coupled to the operating device, so that the setting member is operated jointly with the pressure plate depending on the control of the clutch moment. The greater the load on the plate package, the further the bores are released and the greater the oil volume flow. The further the clutch is opened, the further the bores will be closed, with the oil volume flow being reduced accordingly. By axially moving the pressure plate, the torque to be transmitted by the plate package between the inner plate carrier and the outer plate carrier can be variably controlled according to requirements.

According to an example embodiment, the clutch assembly comprises spring means which are axially supported on the inner plate carrier and move the setting member axially away from the supporting plate. The spring means are configured such that they can receive an external force, store same as energy and release same again, when being relieved. For example, the spring means can be one or several spring elements such as a plate spring, helical spring, corrugated spring or the like which are supported between the setting member on the one side and on the inner plate carrier on the other side.

On its radial outside, the setting member can comprise a disc portion which is axially supported against the setting plate of the friction plate clutch and, on its radial inside, a supporting portion against which the spring means are axially supported. The cover portions preferably extend from the supporting portion in the axial direction into the channels of the inner plate carrier. In the circumferential regions between the tongues, the setting member can comprise a plurality of radial projections which rotatingly engage corresponding recesses in the inner plate carrier. In this way, a relative movement between the setting member, the spring means and the inner plate carrier can be prevented.

According to an example embodiment, the setting member, via its outer disc portion, is axially supported against the pressure plate. Between the setting member and the operating device, an axial bearing can be provided, e.g., a needle bearing. The axial bearing allows a relative rotational movement and an axial transmission of force between an operating member of the operating device and the pressure plate rotating therewith.

The setting member can be produced in the form of a formed sheet metal part, in particular by the production steps: providing a round metal blank, cutting out the radial inner contour of the round metal blank for producing a plurality of radially inwardly projecting cover portions, and projections circumferentially arranged between the cover portions, deep drawing the round metal blank for producing the disc portion and the supporting portion axially offset relative thereto, and bending the cover portions so that they extend in axial direction and parallel relative to one another. If the supporting portion is positioned in a radial plane, the portions are bent by 90 degrees. According to a possible embodiment, the setting member can also be hardened, in particular for applications in which a portion of the setting member serves as a contact face for a rolling contact bearing.

The operating device is configured and/or controllable for moving the pressure plate towards the supporting plate, i.e. in the closed state of the friction plate clutch and/or for moving the pressure plate away from the supporting plate, i.e. in the open state of the friction plate clutch. More particularly, it is proposed that the operating device controls the friction plate clutch in the closed state and in the open state. For this purpose, a rotary drive with a rotation/translation convertor can be provided, for example, so that a rotational movement in a first rotational direction causes loading of the pressure plate and thus a closing of the clutch, whereas a rotational movement in a second rotational direction causes the pressure plate to be moved away from the plate package and thus an opening of the clutch.

According to a possible embodiment, the operating device comprises a ramp mechanism with a supporting ring that is axially supported against a stationary component, and a setting ring which is axially displaceable, as well as a drive unit for rotating one of the supporting ring and the setting ring relative to the other one of the supporting ring and the setting ring. The supporting ring and/or the setting ring comprise a ramp structure, so that a rotational movement of the drive unit can be converted into an axial movement of the setting ring. According to a further embodiment, the ramp mechanism can be configured as a ball ramp mechanism, wherein the two discs, on their end faces facing one another, each comprise a plurality of circumferentially extending ball grooves with variable depths. In pairs of opposed ball grooves there is received a respective ball via which the two discs are supported against each other. By rotating one disc relative to the other, the balls move in flatter or deeper groove regions, so that the axial position of the pressure plate and thus the friction moment of the multi-plate clutch can be set according to requirements. For rotating one of the discs relative to the other one an electric motor can be provided, for example, that with a pinion engages a toothed structure at an outer face of the rotatable disc.

Further provided is a transmission assembly for a motor vehicle comprising: a reduction gearing which is configured for transmitting a rotational movement introduced by an input part from high speed to slow speed, as well as a differential gearing arranged behind the reduction gearing in the performance path and which is configured to distribute a torque introduced via the reduction gearing to two output parts, wherein the reduction gearing comprises an intermediate shaft and a first intermediate gear rotatably supported on the intermediate shaft, and wherein a clutch assembly according to any one of the above embodiments is provided that is arranged in the performance path between the intermediate shaft and the first intermediate gear rotatable relative to the latter. As described above, the clutch assembly allows a passive mechanical control of the oil flow by the clutch operating device as a function of its switching position. This leads to low drag losses in an advantageous manner. The assembly can be arranged in the driveline for a motor vehicle having a driven axle, for a four wheel drive vehicle, for a hybrid vehicle and/or an electric vehicle.

The reduction gearing can comprise a rotatingly drivable driveshaft and a first transmission stage with a first gear set as well as a second transmission stage with a second gear set for transmitting torque from the driveshaft to the intermediate shaft with different transmission ratios. More particularly, it is proposed that the first gear set comprises a first input gear which is connected to the driveshaft in a rotationally fixed way, and the first intermediate gear, and that the second gear set comprises a second input gear connected to the driveshaft in a rotationally fixed way and a second intermediate gear which is rotatable relative to the intermediate shaft. For controlling a transmission of torque via the second gear set a second clutch assembly according the above embodiment is arranged in the power path between the intermediate shaft and the second intermediate gear. The intermediate shaft can comprise an output gear for transmitting torque to the differential carrier of the differential gearing, wherein in particular it is proposed that the rotational axis of the differential carrier extends parallel to the rotational axis of the intermediate shaft and that the output gear is arranged axially between the two transmission stages.

Preferred embodiments will be described below with reference to the drawings wherein.

FIGS. 1 to 6, which will be described jointly, show an exemplary clutch assembly 2 for a driveline of a motor vehicle. The clutch assembly 2 comprises a friction plate clutch 3 and an operating device 4 for controlling the torque to be transmitted by the friction plate clutch. The friction plate clutch 3 is cooled and lubricated and can thus also be referred to as wet clutch. The clutch 3 is actuated by the device 4 which can also be referred to as actuating device.

The friction plate clutch 3 comprises an inner plate carrier 5 to which inner plates 7 are connected in a rotationally fixed and axially movable way, and an outer plate carrier 7 to which outer plates 8 are connected in an axially movable and rotationally fixed way. The outer plates 8 and the inner plates 6 are arranged so as to alternate axially and jointly form a plate package 9. The plate package 9 is axially supported in a first axial direction against a supporting plate 10. In the present embodiment, the supporting plate 10 is integrally formed with the inner plate carrier 5 without being restricted to this configuration. A pressure plate 11 is provided for loading the plate package 9 which can be axially moved by the controllable operating device 4.

The operating device 4 is configured and controllable such that the torque to be transmitted by the friction plate clutch 3 can be variably set as required. In addition to the open position in which no torque is transmitted between the inner plate carrier 5 and the outer plate carrier 7, and a closed position in which the plate carriers 5, 7 jointly rotate around the rotational axis, with the full amount of torque being transmitted, any intermediate position can also be realised by the friction plate clutch 3. For example, the torque to be transmitted can be determined by an electronic control unit (ECU) on the basis of continuously sensed driving condition parameters of the motor vehicle. The electronic control unit transmits the respective control signal to the operating device 4 which then loads the pressure plate 11 accordingly, so that the required torque is transmitted by the friction plate clutch 3.

The inner plate carrier 5 comprises a sleeve portion 13 which extends axially from the supporting portion 10 and on which the inner plates are held in a rotationally fixed and axially movable way. For this purpose, the sleeve portion 13 comprises an outer face with longitudinal teeth 14 which are engaged by corresponding inner teeth of the inner plates 6 in a form-locking way for torque transmission. In the sleeve portion 13, there is provided a plurality of circumferentially distributed bores 15 to allow oil to pass through for cooling and lubricating the plate package 9. In that respect, the bores 15 can also be referred to as through-bores or through-apertures.

Figure 3:
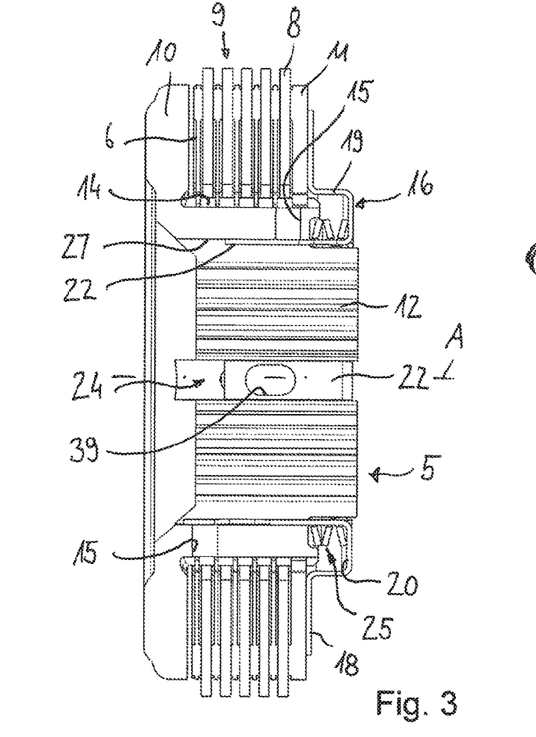
FIG. 3 shows the unit comprising an inner plate carrier, a plate package, a pressure place, a setting member and spring means of the clutch assembly according to FIG. 1 in a longitudinal section.
Figure 4:
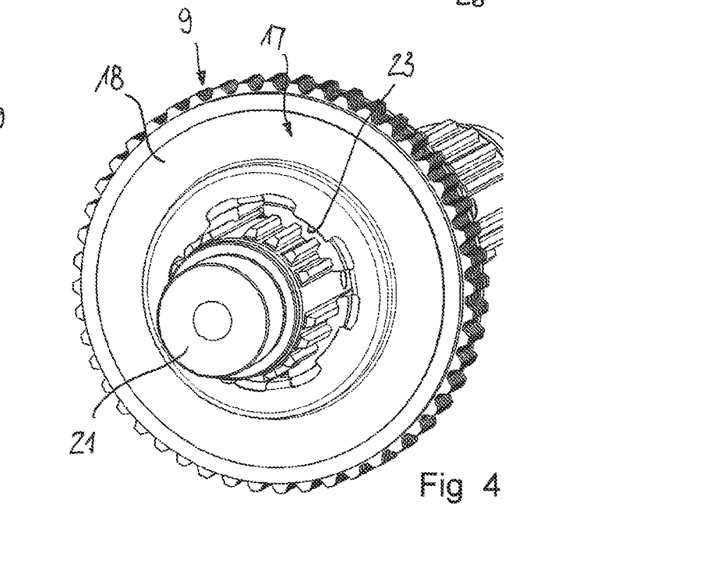
FIG. 4 shows the unit according to FIG. 3 with a driveshaft in a perspective axial view of the setting member.

On its radial inside, the inner plate carrier 5 comprises an engaging structure 12 for being connected to the driveshaft 21 in a rotationally fixed way, wherein said engaging structure 12 is interrupted by a plurality of circumferentially distributed channels 24. In the present embodiment, the engaging structure 12, more particularly, comprises a plurality of spline segments which can be made to form-lockingly engage corresponding shaft splines of the driveshaft 21 for transmitting torque. In the mounted condition, the inner plate carrier 5 is axially supported against the driveshaft 21, in particular against a shoulder 76 of the driveshaft. Axial forces introduced from the operating unit 4 via the pressure plate 11 into the plate package 9 are thus transmitted via the inner plate carrier 5 into the driveshaft 21 and supported by same. In FIG. 3 it can be seen that the circumferentially distributed bores 15 of the inner plate carrier 5 are arranged in the circumferentially regions of the axially extending channels 24. When the inner plate carrier 5 rotates, the oil contained in the channels 24 flows into the bores 15 due to the centrifugal force and through these it flows radially outwardly towards the plate package 9.

The oil volume flowing through the bores 15 is controlled by a flow controller 16 which can be operated by the operating unit 4. The flow controller 16 regulates the flow rate of the oil through the bores 15 and can thus also be referred to as flow regulator. In addition to the operating unit 4, the flow controller 16 comprises an axially movable setting member 17 by which the bores 15, as a function of the axial position of the setting member 17, can be continuously covered and/or opened. The oil volume flow through the bores 15 depends on the respective extent of coverage between the bores 15 and the setting member 17, i.e. on the axial position of the setting member 17. To that extent, the setting condition of the actuating device 4—on which the clutch condition of the friction plate clutch 3 also depends— serves as the control parameter for the oil volume flow. When the clutch 3 is open, the extent of coverage of the bores 15 is large and the oil volume flow is correspondingly small, so that the drag losses are small. When the clutch 3 is closed, i.e., under clutch conditions under which the clutch transmits torque, the extent of coverage of the bores 15 is small, i.e., the bores 15 are largely uncovered and the oil flow volume is high.

The setting member 17 is connected to the inner plate carrier 5 in a rotationally fixed and axially movable way. According to the present exemplary embodiment, the setting member 17, on its radial outside, comprises a disc portion 18 which is axially supported against the pressure plate 11, a sleeve portion 19 which, on the radial inside, adjoins the disc portion 18 and extends in the axial direction, an annular supporting portion 20 adjoining the sleeve portion on its radial inside, as well as a plurality of cover portions 22 axially extending from the supporting portion 20. In half the longitudinal section, the disc portion 18, the sleeve portion 19, and the supporting portion 20 form a Z-shape, which is the reason why the present setting member 17 can also be referred to as a Z-disc. In circumferential regions between two adjoining cover portions 22, the setting member 17 comprises radial projections 23 which engage corresponding longitudinal recesses in the outer face of the inner plate carrier 5 in a rotationally fixed and axially movable way.

The cover portions 22 serve for selectively covering and releasing the mouth regions of the bores 15. They extend into the channels 24, wherein the outer faces of each tongue are in planar contact with the inner face 27 of the associated channel. More particularly, it is proposed that the cover portions 22 and the inner faces 27 of the channels 24 are configured to be planar, so that in the open condition of the clutch effective sealing conditions are ensured. It can be seen in particular in FIGS. 3 and 4 that the cover portions 22 each comprise an aperture 39. In principle, the number of cover portions 22 and channels 24 is freely selectable and in the present embodiment there are provided four, which are in particular regularly distributed around the circumference. It can also be seen that some of the through-apertures 15 of the inner plate carrier 5 are arranged in different planes, i.e., in different axial positions of the sleeve portion 13. The same applies to the apertures 39 which are configured and arranged in such a way that both apertures 15, 39 are at least largely aligned relative to one another. In this way, a large volume flow can reach the plate package 9 for cooling and lubricating the plates. More particularly, at least some of the apertures 39 can be shaped like oblong holes.

Figure 6:
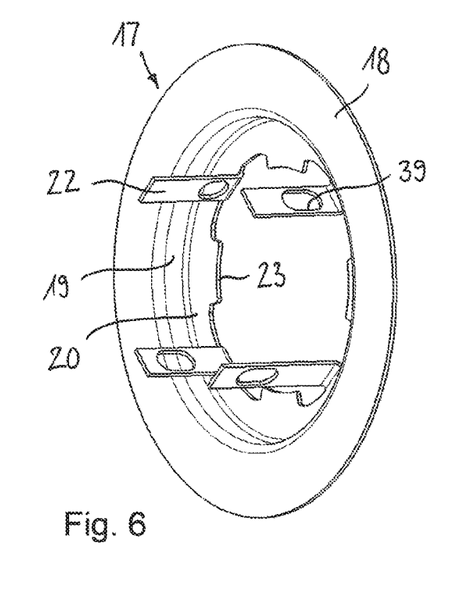
FIG. 6 shows the setting member of the clutch assembly according to FIG. 1 in a perspective view.

The setting member 17 can be produced as a sheet metal part, for example, from a round sheet metal blank by cutting out the radial inner contour, whereby the cover portions 22 and the projections 23 positioned in the circumferential direction between the tongues are produced, and deep-drawing the round sheet metal blank, whereby the disc portion 18 and the supporting portion 20 axially offset thereto are produced, and by bending the cover portions 22 from the supporting portion 20, whereby the cover portions 22 are each bent by 90 degrees. The cover portions can also be referred to as tongue portions or segments.

The flow controller 16 comprises spring means 25 which are arranged so as to be effective between the inner plate carrier 5 and the setting member 17 such that the setting member is axially loaded away from the supporting plate 10, i.e., in the open state of the clutch 3. Thus, in an unloaded condition, the spring means 25 act as an energy store for returning the setting member 17.

Figures 1, 2:
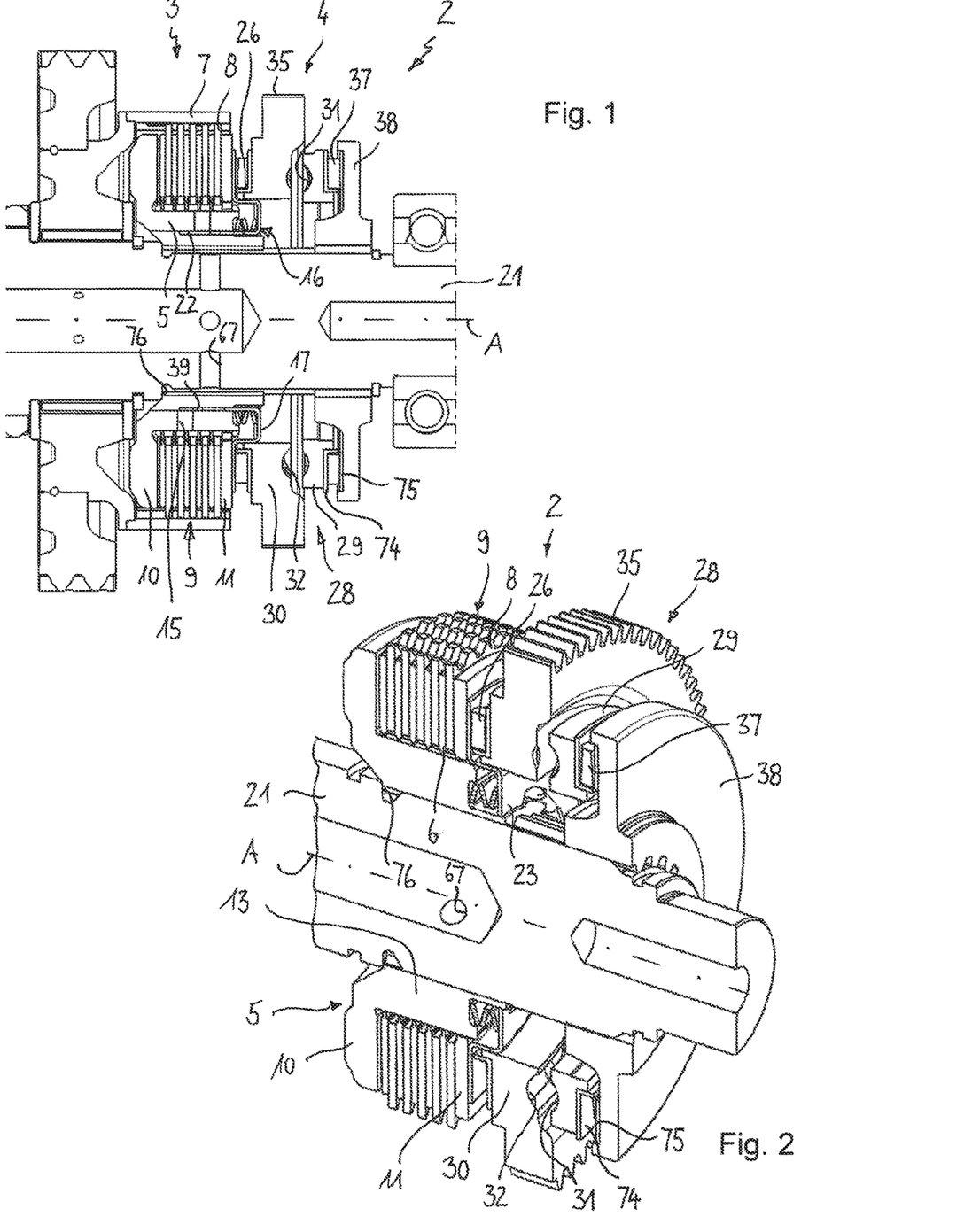
FIG. 1 shows an exemplary clutch assembly in a longitudinal section.
FIG. 2 shows the clutch assembly according to FIG. 1 in a perspective view.

It can be seen in particular in FIGS. 1 and 2 that an axial bearing 26 is provided between the operating device 4 and the friction plate clutch 3, which, in the present embodiment, is provided in the form of a needle bearing. It is understood that other types of bearing are also possible such as friction bearing. The axial bearing permits an axial transmission of force from the operating device 4 to the pressure plate 10 while at the same time rotationally decoupling the setting member 17 from the operating element 4, which setting member 17 jointly rotates with the inner plate carrier 5. In the present embodiment it is proposed that the setting member 17, via a first side face of the disc portion 18, is axially supported against the pressure plate 11 and via the opposed second side face it is in contact with the axial bearing 26. The disc portion 18 of the setting member 17 serves as the rolling contact face for the needle bearing 26, which is the reason why it is proposed in particular that at least the disc portion 18 or the entire setting member is hardened.

By operating the operating device 4 in the closed state, the setting member 17 is axially loaded by the axial bearing 26 towards the supporting plate 10, wherein the introduced axial force is transmitted to the pressure plate 11, so that the pressure plate 11 and the setting member 17 are jointly moved axially. As a result, the clutch 3 is increasingly closed by the pressure plate 11 and the bores 15 are increasingly opened by the setting member 17 to allow the passage of oil, and wherein the spring means 25 are axially pre-tensioned. When the operating device 4 is again operated in the open state, the spring means 25 release the stored energy and move the setting member 17 towards the operating device 4, with the bores 15 increasingly being closed. In the present embodiment, the spring means 25 comprise a package of several plate springs, but other types of spring elements can also be used.

Figure 5:
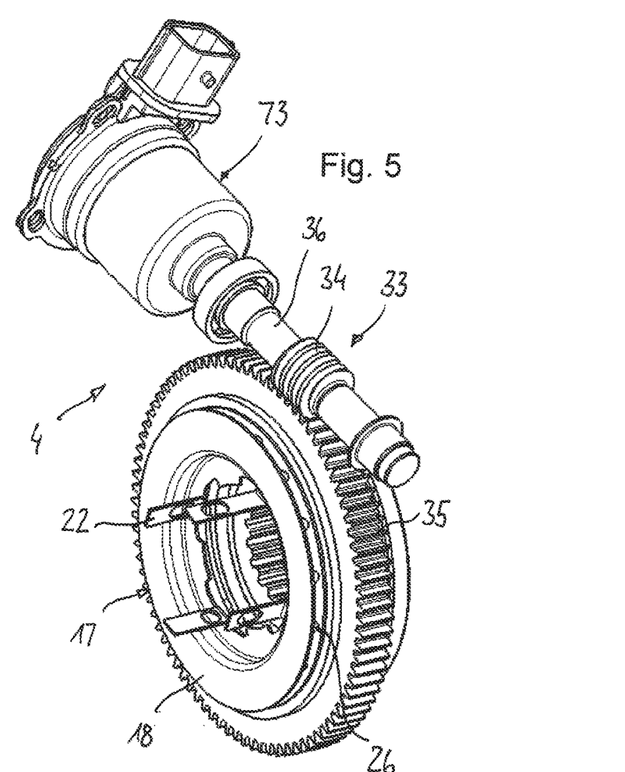
FIG. 5 shows a detail of the operating unit of the clutch assembly according to FIG. 1 in a perspective view.

In the present embodiment, the operating device 4 comprises a ball ramp mechanism 28 and a drive unit 73. The ball ramp mechanism 28 comprises a supporting ring 29 which is axially supported relative to a stationary component as well as a setting ring 30 which is arranged opposite the supporting ring and which is rotatingly drivable around the rotational axis A2. It is proposed in the present embodiment that the supporting ring 29 is axially supported via an axial bearing 37 against a supporting plate 38. The axial bearing 37 comprises a bearing disc 74 which is axially supported against a rear side of the supporting ring 29, as well as rolling contact members which roll on the bearing disc 74. A shim ring 75 is arranged between the axial bearing 37 and the supporting plate 38. The shim ring 75 serves to set and define the play of the friction plate clutch 3, so that the shim ring 75 indirectly also influences the position of the setting member 17. Like the bearing disc 74, the shim ring 75 is hardened and serves as a rolling face for the needle bearing 37. The supporting plate 38 is connected to the driveshaft 21 in a rotationally fixed way and is axially supported against same via a securing ring. However, it is understood that the ball ramp unit 28 can also be axially supported against another component, for example a stationary housing.

In opposed end faces of the supporting ring 29 and the setting ring 30, there are arranged circumferentially distributed ball grooves 31, 32 which comprise a variable depth in a circumferential direction and in each of which a ball is received. An electric motor serves as a drive unit to operate the ball ramp unit 28. The motor can rotate the setting ring 30 relative to the supporting ring 29 via a worm gear 33. The worm gear 33 comprises a worm 34 rotatingly drivable by the electric motor and a gear 35 which engages the worm. The gear 35 is connected to the setting ring 30, e.g., is produced so as to be integral therewith. The worm gear 33 is in particular self-inhibiting, which means that when the operating unit 4 is disconnected from power, the gear 35 remains in the actual rotational position, so that, accordingly, the clutch 3 also remains in the actual clutch position. An automatic return effected by the spring means 25 does not take place. The spring means 25 merely passively support the opening process, which, however, is actively initiated by the operating device 4, respectively the electric motor 73. The main function of the spring means consists in axially pretensioning the two axial bearings 26, 27 and in axially holding and/or pretensioning the inner plate carrier 5 against the stop 76, as well as in the opposite direction axially holding and/or pretensioning the actuator rings 29, 30 against the supporting plate 38.

When the worm 34 is rotationally moved by the electric motor, the gear 35 and thus the setting ring 30 are rotated relative to the supporting ring 29. Depending on the rotational direction of the motor shaft 36 and the worm 34 connected thereto, the setting ring 30 can be rotated into first direction of rotation or in the opposed second direction of rotation. Starting from a starting position in which the two rings 29, 30 axially approach one another, a rotation of the setting ring 30 relative to the supporting ring 29 in a first direction of rotation causes the balls held in the ball grooves 31, 32 to run in regions of a reduced depth, so that the setting ring moves axially towards the clutch 3. The setting ring 30 is axially supported via the axial bearing 26 against the setting member 17 and the pressure plate 11 respectively which, accordingly are moved jointly towards the supporting plate 10. In this way the clutch 3 is closed and the through-flow controller 16 is opened. In its fully closed condition, the plate package 9 receives maximum load, so that the full amount of torque is transmitted between the inner plate carrier 5 and the outer plate carrier 7. If the electric motor and thus the setting ring 30 are rotated into the opposed second rotational position, the balls held in the ball grooves 31, 32 again move into the regions of a greater groove depth, wherein the setting ring 30 is axially loaded and moved respectively by the spring means 25 via the setting member 17 towards the supporting ring 29. In this way the clutch 3 is opened again and the flow controller 16 is closed.

The clutch assembly 2 has a very good cooling effect on the clutch 3 in its operated condition and comprises particularly low drag moments in the un-operated condition. In principle, such a clutch assembly 2 can be used in any location in the driveline of a motor vehicle.

Figure 7:
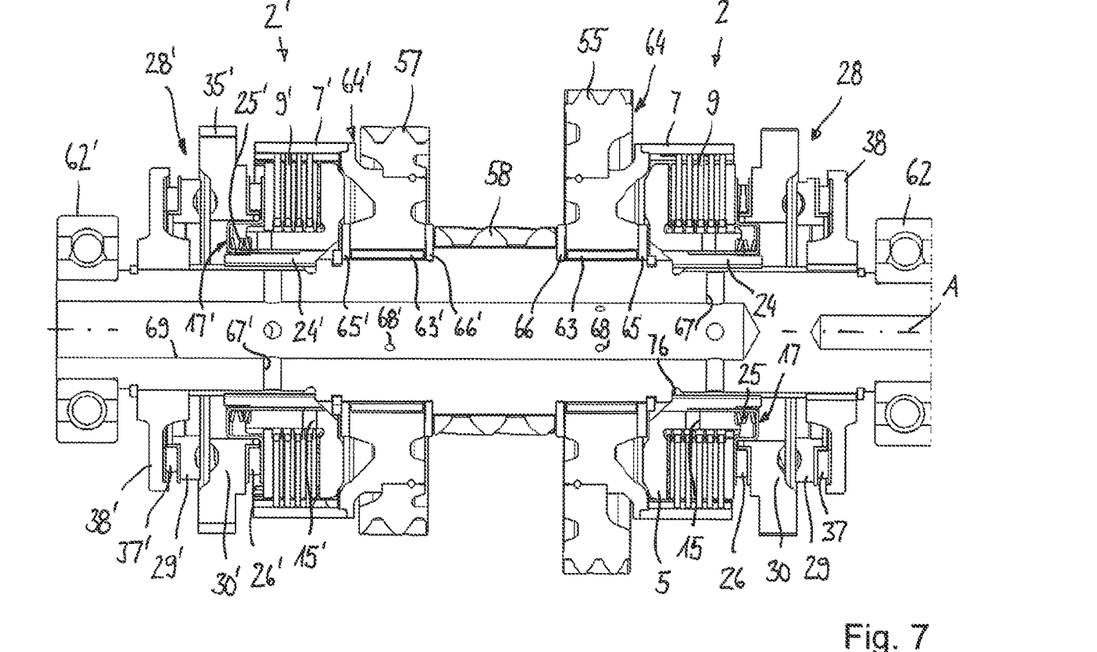
FIG. 7 shows a driveshaft assembly with a clutch assembly according to FIG. 1 in a longitudinal section.
Figure 8:
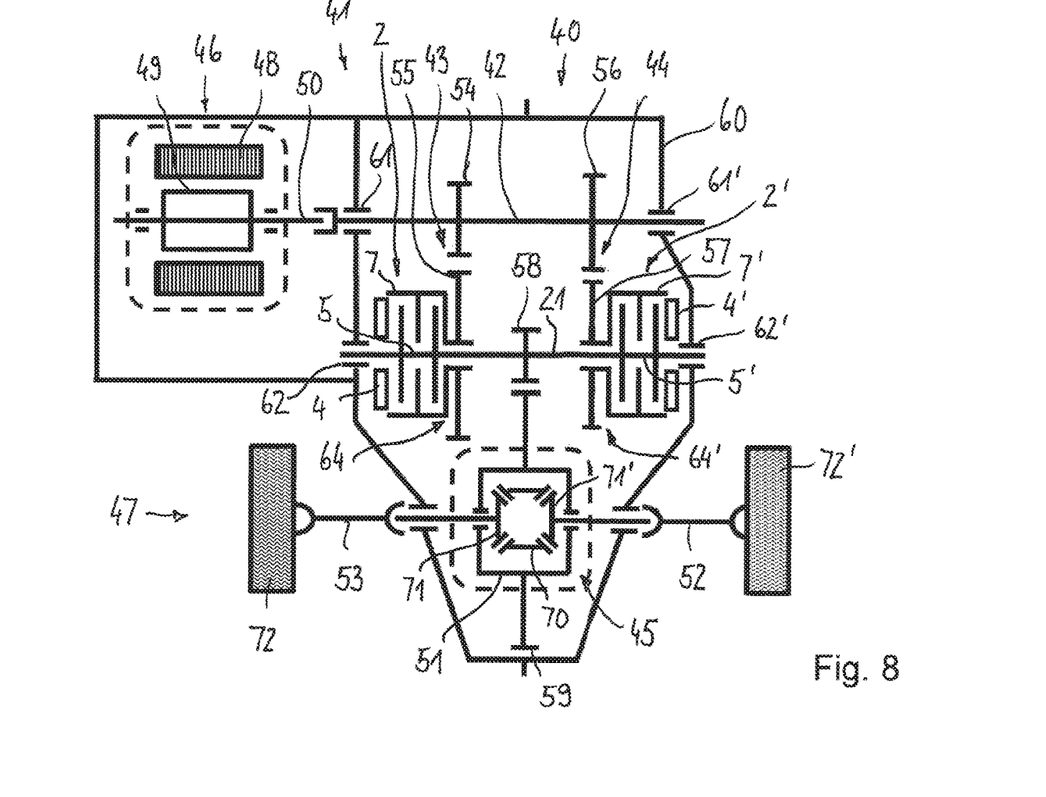
FIG. 8 shows a drive assembly with a driveshaft assembly according to FIG. 7 in a diagrammatic view.

One example of using the exemplary clutch assembly is in incorporating it into a transmission assembly 40 and/or a drive assembly 41 in accordance with FIGS. 7 and 8 which will be described jointly below.

The transmission assembly 40 comprises a driveshaft 42, a first transmission stage 43, a second transmission stage 44, an intermediate shaft 21 with two clutch assemblies 2, 2', as well as a differential gearing 45. The clutch assemblies 2, 2' correspond to the clutch assembly 2 shown in FIGS. 1 to 6, to the description of which reference is hereby made. The transmission stages 43, 44 allow torque introduced into the transmission assembly 40 to be transmitted by the driveshaft 43 to the intermediate shaft 21 and to the differential gearing 45 with two different transmission ratios i1, i2.

The driveshaft 43 is rotatingly drivable by a drive source 46 which, more particularly is provided in the form of an electric machine. The unit comprising the electric machine 46 and the transmission 40 is also referred to as an electric drive assembly 41 or briefly as an electric drive. The electric machine 46 comprises a stator 48 and a rotor 49 rotatable relative thereto, which electric machine 46 when electric current is supplied thereto, rotatingly drives a motor shaft 50. The rotational movement of the motor shaft 50 is transmitted to the driveshaft 43 of the transmission 40. The electric machine 46 is supplied with electric current by a battery (not shown), wherein it is also possible that the battery can be loaded by the electric machine if the latter is operated in a generator mode.

The torque introduced into the drive 40 by the electric machine 46 can be transmitted to the intermediate shaft 21 by the first clutch assembly 2 or the second clutch assembly 2' and optionally via the first transmission stage 43 or the second transmission stage 44, so that the differential gearing 45, respectively the associated driving axle 47 of the motor vehicle can be driven in two different speed ranges. The intermediate shaft 21 is drivingly connected to the differential carrier 51 of the differential gearing 45. By means of the differential gearing 45, the introduced torque is divided up and transmitted to two sideshafts 52, 53 for driving the vehicle wheels.

The transmission unit 40 is configured as a reduction gearing, so that a rotational movement introduced by the electric motor 46 is translated from high speed to low speed. The first transmission stage 43 which can also be referred to as a gear stage comprises a first driving gear 54 connected to the driveshaft in a rotationally fixed way and a first intermediate gear 55 rotatably supported on the intermediate shaft, which gears 54, 55 engage one another. The first driving gear 54 and the first intermediate gear 55 form a first gear set with a first transmission ratio i1. The second transmission stage 44 comprises a second driving gear 56 connected to the driveshaft 43 in a rotationally fixed way, and a second intermediate gear 57 rotatably supported on the intermediate shaft 21 which engage one another. The second driving gear 56 and the second intermediate gear 57 form a second gear set with a second transmission ratio i2. A third transmission stage comprises the output gear 58 connected to the intermediate shaft 21 in a rotationally fixed way and the annular gear 59 engaging therewith and firmly connected to the differential carrier 51. The output gear 58 of the intermediate shaft 21 and the annular gear 59 form a third gear set with a third transmission ratio i3.

The driveshaft 43 is supported in a housing 60 of the drive unit by suitable bearings 61, 61' so as to be rotatable around a rotational axis A1. The driving gears 54, 56 can be rotationally fixed to the driveshaft 42 by splines, for example. The intermediate shaft 21 is supported by suitable bearings 62, 62' in the housing 60 so as to be rotatable around a second rotational axis A2. The output gear 58 is connected to the intermediate shaft 21 in a rotationally fixed way and is arranged axially between the first and second intermediate gear 55, 57. The intermediate gears 55, 57 are rotatably supported on the intermediate shaft 21 by shaft bearings 62, 62'. The driveshaft 43, the intermediate shaft 21, and the rotational axis A3 of the differential carrier 51 extend parallel relative to one another.

The two clutch assemblies 2, 2' correspond to one another in respect of their configuration and mode of functioning. By way of example, only one of the two clutch assemblies will be described, with the description applying to both of them. In the present embodiment, the outer plate carrier 7 is firmly connected to the intermediate gear 57, more particularly, it is welded thereto. The gear unit 64 formed in this way is supported on the intermediate shaft 21 by means of an associated shaft bearing 62. The gear unit 64 is axially supported by two axial bearings 65, 66 that are in particular configured as sliding discs. The sliding disc 65 at the clutch end is axially supported against the intermediate shaft 21 via a securing ring. The second sliding disc 66 is axially supported against a shoulder of the intermediate shaft 21. The intermediate shaft 12 is provided in the form of a hollow shaft and, on the shaft portions to be lubricated, it comprises a plurality of radial bores 67, 68 through which oil can flow radially outwardly from the interior 69 of the shaft to the friction plate clutches 3, 3' and to the shaft bearings 63, 63' of the gear units 64, 64'.

The output gear 58 of the intermediate shaft 21 engages the annular gear 59 of the differential carrier 51 for introducing torque into the differential gearing 45. The differential carrier 51 is supported in the housing 60 so as to be rotatable around the rotational axis X3. The differential 45 comprises a plurality of differential gears 70 which are rotatably supported in the differential carrier 52 on an axle extending perpendicularly relative to the rotational axis X3, as well as two sideshaft gears 71, 71' that engage the differential gears 70 and are each rotatably arranged coaxially relative to the rotational axis X3. The torque introduced by the annular gear 59 into the differential carrier 51 is transmitted via the differential gears 70 to the two sideshaft gears 71, 71' between which a differential effect is given. The sideshaft gears 71, 71' are torque transmittingly connected to the associated sideshafts 72, 72' which transmit the introduced torque to the wheels 73, 73' of the motor vehicle.

The drive unit 40 is operated by the clutches 2, 2' which can be operated by the respective actuator 4, 4'. By suitably controlling the actuators 4, 4', a torque introduced into the transmission 40 can be transmitted either by the first clutch assembly 2 via the first transmission stage 43 in a first speed range to the differential 45, or it can be transmitted by the second clutch assembly 2' via the second transmission stage 44 in a second speed range. Because of the configuration of the clutch assemblies 2, 2', the torque to be transmitted and the rotational speed respectively can be variably set as required. When the two clutches 3, 3' are open, the intermediate shaft 21 and the drive components positioned in the power path therebehind can be disconnected from the components arranged in the power path in front of the clutches 3, 3' and the electric machine. The setting members 17 are closed so that the oil volume flow is small and the drag moments are correspondingly minimised.

If both clutches 3, 3' are closed, they block the rotational movement of the gearing components, so that thereby a parking lock function for the electric drive is effected. Because the worm gear 33 is configured to be self-inhibiting, the two operating units 4, 4' can be switched off, so that no further current is required for holding the closed position.

LIST OF REFERENCE NUMBERS 2 clutch assembly
3 friction plate clutch 4 operating device
5 inner plate carrier
6 inner plates
7 outer plate carrier
8 outer plates
9 plate package
10 supporting plate
11 pressure plate
12 engaging structure
13 sleeve portion
14 longitudinal teeth
15 bore
16 flow controller
17 setting member
18 disc portion
19 sleeve portion
20 supporting portion
21 driveshaft
22 tongue portion
23 projection
24 channel
25 spring means
26 axial bearing
27 inner face
28 ball ramp mechanism
29 supporting ring
30 setting ring
31 ball grooves
32 ball grooves
33 worm gear
34 worm
35 gear
36 motor shaft
37 axial bearing
38 supporting plate
39 aperture/opening
40 transmission assembly
41 drive assembly
42 driveshaft
43 first transmission stage
44 second transmission stage
45 differential gearing
46 drive source
47 driving axle
48 stator
49 rotor
50 motor shaft
52 differential carrier
52 sideshaft
53 sideshaft
54 first driving gear
55 first intermediate gear
56 second driving gear
57 second intermediate gear
58 output gear
59 annular gear
60 housing
61,61' bearing
62,62' bearing
63,63' shaft bearing
64, 64' gear unit
65,65' sliding disc
66,66' sliding disc
67,67' radial bore
68,68' radial bore
69 inner chamber
70 differential gear
71,71' sideshaft gear
72,72' gear
73 drive unit
74 bearing disc
75 shim ring
76 stop
A axis

The invention claimed is:

1. A clutch assembly for a driveline of a motor vehicle, comprising:
   a friction plate clutch having an inner plate carrier to which inner plates are connected in a rotationally fixed and axially movable way, and an outer plate carrier to which outer plates are connected in a rotationally fixed and axially movable way, wherein the inner plates and the outer plates form a plate package, wherein the inner plate carrier comprises at least one bore in an axial overlapping region with the plate package, through which bore oil can flow to the plate package,
   a supporting plate against which the plate package is axially supported,
   an axially movable pressure plate for axially loading the plate package,
   an operating device for operating the friction plate clutch by axially moving the pressure plate,
   a flow controller for controlling an oil volume flow rate through the at least one bore of the inner plate carrier, wherein the flow controller comprises a setting member which is operable by the operating device for the friction plate clutch, wherein the setting member comprises a cover portion for covering an opening region of the at least one bore.

2. The clutch assembly according to claim 1, wherein the setting member is connected to the inner plate carrier in a rotationally fixed and axially movable way.

3. The clutch assembly according to claim 1, wherein the inner plate carrier comprises a plurality of circumferentially distributed bores which are arranged in at least one plane, wherein the oil volume flow rate through the bores is controllable by axially moving the setting member.

4. The clutch assembly according to claim 3, wherein the setting member comprises a plurality of circumferentially distributed axially extending cover portions, wherein the cover portions are each associated with a respective one of the bores of the inner plate carrier for controlling the oil volume flow rate.

5. The clutch assembly according to claim 3, wherein the inner plate carrier comprises a sleeve portion that, radially outside, comprises an engaging structure which is engaged by the inner plates in a rotationally fixed and axially movable way and that, radially inside, comprises an inner face with a plurality of axially extending channels, wherein the bores of the inner plate carrier are arranged in circumferential regions of the channels.

6. The clutch assembly according to claim 4, wherein the cover portions each extend into a respective one of the channels, wherein bottom faces of the channels and the respective cover portions are planar.

7. The clutch assembly according to claim 1, wherein the at least one cover portion of the setting member each comprises an aperture which, in a closed condition of the friction plate clutch, at least largely closes the at least one bore and, in a slip condition of the friction plate clutch, at least largely releases the at least one bore.

8. The clutch assembly according to claim 1,
wherein at least one spring is provided which is axially supported against the inner plate carrier and loads the setting member axially away from the supporting plate.

9. The clutch assembly according to claim 8,
wherein the setting member, radially outside, comprises a disc portion that is axially supported against the pressure plate of the friction plate clutch, and, radially inside, a supporting portion against which the at least one spring is axially supported, wherein the cover portion extends from the supporting portion in axial direction into a channel of the inner plate carrier.

10. The clutch assembly according to claim 9,
wherein the supporting portion comprises a plurality of radial projections that are arranged circumferentially offset from the at least one cover portion, which radial projections engage corresponding recesses of the inner plate carrier in a rotationally fixed way.

11. The clutch assembly according to claim 1, wherein the operating device is controllable to at least one of:
move the pressure plate towards the supporting plate toward a closed state, and
move the pressure plate away from the supporting plate toward an open state.

12. The clutch assembly according to claim 1,
wherein an axial bearing is provided between the setting member and the operating device.

13. The clutch assembly according to claim 1,
wherein the operating device comprises a ramp mechanism with a supporting ring that is axially supported against a stationary component, and a setting ring that is axially displaceable, the operating unit further comprising a drive unit for rotating one of the supporting ring and the setting ring relative to the other one of the supporting ring and the setting ring, wherein the supporting ring and the setting ring comprise a ramp structure, so that a rotational movement of the drive unit is converted into an axial movement of the setting ring.

* * * * *